United States Patent
Mimatsu

(10) Patent No.: US 8,015,146 B2
(45) Date of Patent: Sep. 6, 2011

(54) METHODS AND SYSTEMS FOR ASSISTING INFORMATION PROCESSING BY USING STORAGE SYSTEM

(75) Inventor: Yasuyuki Mimatsu, Cupertino, CA (US)

(73) Assignee: Hitachi, Ltd., Tokyo (JP)

( * ) Notice: Subject to any disclaimer, the term of this patent is extended or adjusted under 35 U.S.C. 154(b) by 472 days.

(21) Appl. No.: 12/213,119

(22) Filed: Jun. 16, 2008

(65) Prior Publication Data

US 2009/0313260 A1 Dec. 17, 2009

(51) Int. Cl.
*G06F 7/00* (2006.01)
*G06F 17/00* (2006.01)
*G06F 17/30* (2006.01)
*G06F 15/16* (2006.01)

(52) U.S. Cl. ........ 707/602; 707/664; 707/666; 707/673; 707/711; 707/741; 707/770; 709/201

(58) Field of Classification Search .................. None
See application file for complete search history.

(56) References Cited

U.S. PATENT DOCUMENTS

| | | | |
|---|---|---|---|
| 6,584,548 B1 * | 6/2003 | Bourne et al. | 711/134 |
| 7,162,691 B1 * | 1/2007 | Chatterjee et al. | 715/205 |
| 2005/0216850 A1 * | 9/2005 | Ramos et al. | 715/763 |
| 2005/0240869 A1 * | 10/2005 | Leetaru et al. | 715/530 |
| 2005/0278293 A1 | 12/2005 | Imaichi et al. | |

OTHER PUBLICATIONS http://www.ietf.org/rfc/rfc1094.txt, Mar. 1989, Network Working Group.
http://www.isi.edu/in-notes/rfc2045.txt, Nov. 1996, Network Working Group.
http:/www.isi.edu/in-notes/rfc2046.txt, Nov. 1996, Network Working Group.
SNIA, "Information Management—Extensible Access Method(XAM)—Part 1: Architecture", Version 1.0, Working Draft, Apr. 2, 2008, pp. ii-166.

* cited by examiner

*Primary Examiner* — Charles Rones
*Assistant Examiner* — Harold A Hotelling
(74) *Attorney, Agent, or Firm* — Mattingly & Malur, P.C.

(57) ABSTRACT

In a networked information system, a portion of the information processing is offloaded from servers to a storage system to reduce network traffic and conserve server resources. The information system includes a storage system storing files or objects and having a function which automatically extracts portions of text from the files and transmits the extracted text to the servers. The text extraction is responsive to file requests from the servers. The extracted text and files are stored on the storage system, decreasing the need to send entire files across the network. Thus, by transmitting smaller extracted text data instead of entire files over the network, network performance can be increased through the reduction of traffic. Additionally, the processing strain on physical resources of the servers can be reduced by extracting the text at the storage system rather than at the servers.

9 Claims, 17 Drawing Sheets

Exemplary Hardware and Logical Configuration of a Storage System and Network

Exemplary Hardware and Logical Configuration of a Storage System and Network

10302

| File name extension (20001) | File type (20002) |
|---|---|
| .doc | application/msword |
| .eml | Message/rfc822 |
| ... | |

Exemplary Structure of a File Type Table

| ID of requestor (30301) |
|---|
| X |
| Y |
| ... |

Exemplary Structure of a Text Reader Table

FIG. 3

Exemplary Process Flow of a Management Program

Exemplary Process Flow of a Storage System Control Program

Exemplary Process Flow of Read Request (Step 50005)

Exemplary Hardware and Logical Configuration of a Storage System and Network

Exemplary Data Structure of an Object With Data Fields

Exemplary Data Structure of an Update List Having Pointers to Fields of Object

|     70305 |
| --- |

| Field name prefix of extracted text 100001 | Field name prefix of extraction time 100002 | Field name prefix of extraction policy 100003 |
| --- | --- | --- |
| ".extracted.text.value." | ".extracted.text.time." | ".extracted.text.policy." |

Exemplary Data Structure of a Field Name Structure Table

Exemplary Diagram of Policies

Exemplary Process Flow of a Storage System Control Program

Exemplary Process Flow of a Background Text Extraction Process

Exemplary Process Flow of a Background Text Deletion Process

Exemplary Process Flow of a Write Request (Step 120003)

Exemplary Process Flow of a Read Request (Step 120005)

Exemplary Process Flow of an Export Request (Step 120007)

Exemplary Data Structure of a Job Object

Exemplary Process Flow of a Job Request (Step 120014)

Exemplary Process Flow of a Background Job 190003

METHODS AND SYSTEMS FOR ASSISTING INFORMATION PROCESSING BY USING STORAGE SYSTEM

BACKGROUND OF THE INVENTION

It is a typical process in computer information systems to transfer data stored in a storage system to application server computers, process the transferred data in the server computers, and then store the processed results back in the storage system. Some such processes read large amounts of data from storage systems but generate results of more manageable size. For example, indexing of files to enable searching of the file contents, such as full-text searching, requires transferring various files from a storage system to an index server, parsing of the transferred files, extracting text from the files, and storing each unique word identified in the files into an index data base. The size of the extracted text is usually small (e.g., in the kilobyte range) but the original files to be transferred and processed can often be quite large (e.g., in the megabyte range or larger) because the files contain not only text, but also other data, such as images, sounds, movies, and the like.

The large size of these files consumes network bandwidth and processing resources in the index server when the files are transferred, parsed and processed, particularly, when there are massive amounts of files to be indexed. For example, in a large archive storage system storing petabytes of data, the problem can become severe, causing the indexing process to take a very long time and consume a large amount of network and server resources. Another example of a typical indexing process is creating a thumbnail image from a larger image. In both cases, the problem is rooted in the transfer of large amounts of data through the network, thereby taking up available bandwidth that might be better used for other purposes, and also in consuming large amounts of processing resources in the application servers, which also might be used for other purposes.

A number of different types of communication protocols and methods for facilitating access between servers and storage systems are currently in use. These include NFS (Network File System) protocol, CIFS (Common Internet File System) protocol, and the like. For example, NFS and CIFS protocols are widely used by file servers such as Network Attached Storage (NAS) devices, and so forth. Also the Extensible Access Method (XAM) interface standard has recently been defined. The XAM standard defines an interface method for access across applications, management systems and storage systems to create uniform access to information. XAM annotates objects with metadata providing for the management of information at a high level. This coupling allows policy services to make informed decisions about the management of objects in storage without referring back to the application and without impacting the application. XAM provides a standardized interface and metadata to communicate with object storage devices to achieve interoperability, storage transparency, and increased efficiency. While the above protocols and methods are discussed in exemplary embodiments of the invention, the invention is not limited to any particular communication methods or protocols. Related art includes US Pat. Appl. No. US2005/0278293 to Imaichi et al., filed Jan. 18, 2005, entitled "Document Retrieval System, Search Server, and Search Client", and "Information Management-Extensible Access Method (XAM)—Part 1: Architecture, Version 1.0, Working Draft", Storage Networking Industry Association, San Francisco, Calif., Apr. 2, 2008, the entire disclosures of which are incorporated herein by reference.

BRIEF SUMMARY OF THE INVENTION

Various exemplary embodiments of the invention disclosed herein include methods, systems and computer programs stored on computer readable mediums for reducing workloads of application or index server computers, while also decreasing network traffic, by offloading a portion of the information processing burden from the server computers to a storage system. These and other features and advantages presented herein will become apparent to those of ordinary skill in the art in view of the following detailed description of the preferred embodiments.

BRIEF DESCRIPTION OF THE DRAWINGS

The accompanying drawings, in conjunction with the general description given above, and the detailed description of the preferred embodiments given below, serve to illustrate and explain the principles of the preferred embodiments of the best mode of the invention presently contemplated.

FIG. 2 illustrates an exemplary structure of a file type table.

FIG. 3 illustrates an exemplary structure of a text reader table.

DETAILED DESCRIPTION OF THE INVENTION

Figure 1:
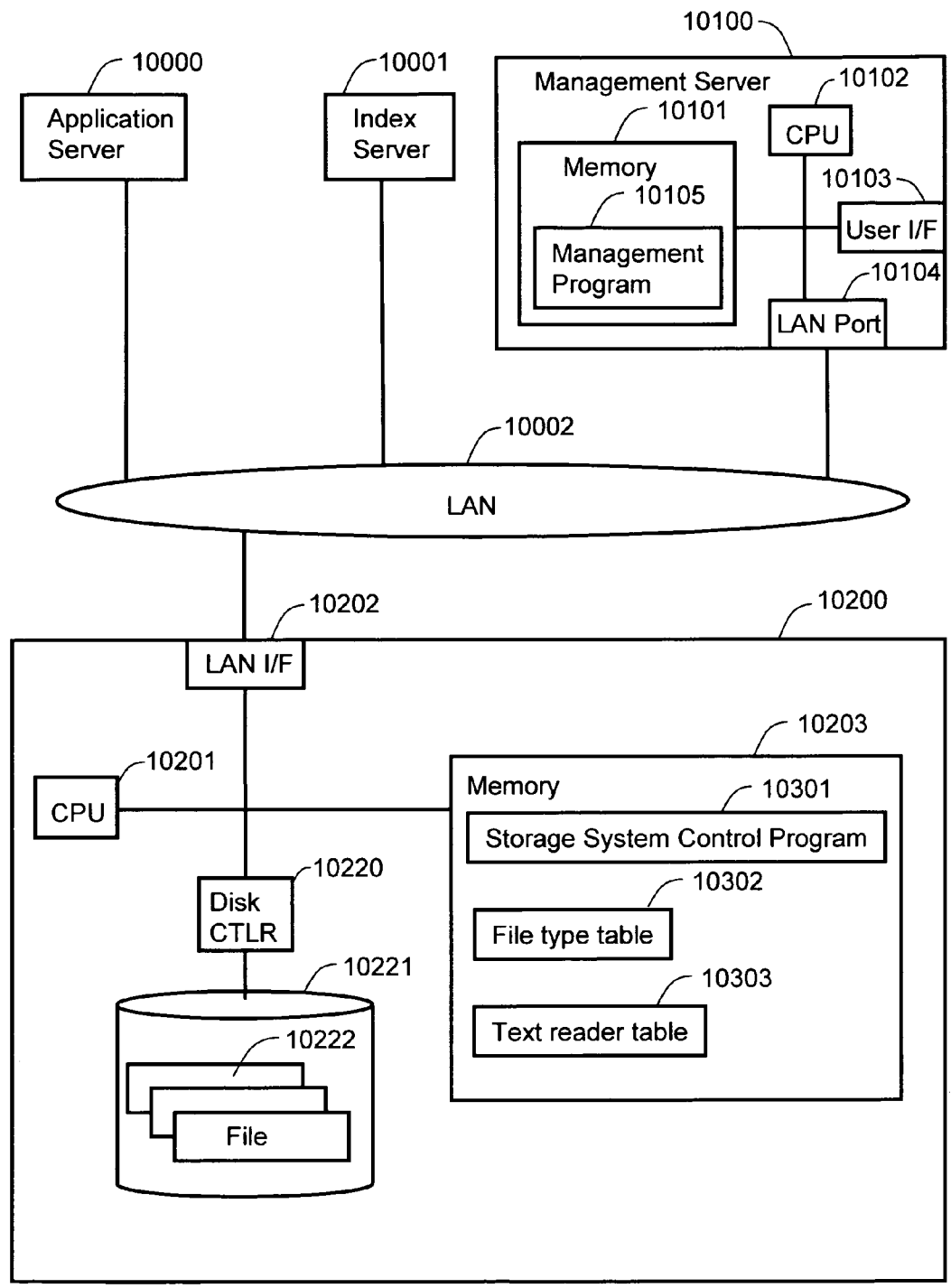
FIG. 1 illustrates an exemplary hardware and logical configuration in which first embodiments of the invention may be applied.

In the following detailed description of the invention, reference is made to the accompanying drawings which form a part of the disclosure, and in which are shown by way of illustration, and not of limitation, exemplary embodiments by which the invention may be practiced. In the drawings, like numerals describe substantially similar components throughout the several views. Further, it should be noted that while the detailed description provides various exemplary embodiments, as described below and as illustrated in the drawings, the present invention is not limited to the embodiments described and illustrated herein, but can extend to other embodiments, as would be known or as would become known to those skilled in the art. Reference in the specification to "one embodiment" or "this embodiment" means that a particular feature, structure, or characteristic described in connection with the embodiment is included in at least one embodiment of the invention, and the appearances of these phrases in various places in the specification are not necessarily all referring to the same embodiment. Additionally, in the following detailed description, numerous specific details are set forth in order to provide a thorough understanding of the present invention. However, it will be apparent to one of ordinary skill in the art that these specific details may not all be needed to practice the present invention. In other circumstances, well-known structures, materials, circuits, processes and interfaces have not been described in detail, and/or may be illustrated in block diagram form, so as to not unnecessarily obscure the present invention.

Furthermore, some portions of the detailed description that follow are presented in terms of algorithms and symbolic representations of operations within a computer system. These algorithmic descriptions and symbolic representations are the means used by those skilled in the data processing arts to most effectively convey the essence of their innovations to others skilled in the art. An algorithm is a series of defined steps leading to a desired end state or result. In the present invention, the steps carried out require physical manipulations of tangible quantities for achieving a tangible result. Usually, though not necessarily, these quantities take the form of electrical or magnetic signals or instructions capable of being stored, transferred, combined, compared, and otherwise manipulated. It has proven convenient at times, principally for reasons of common usage, to refer to these signals as bits, values, elements, symbols, characters, terms, numbers, instructions, or the like. It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "processing", "computing", "calculating", "determining", "displaying", or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices to achieve a tangible real-world result.

The presented embodiments relate in part to a system for performing the operations herein. This system may be specially constructed for the required purposes, or it may include one or more general-purpose computers selectively activated or reconfigured by one or more computer programs. Such computer programs may be stored in a computer-readable storage medium, such as, but not limited to magnetic disks, optical disks, read-only memories, random access memories, solid state devices and drives, or any other type of media suitable for storing electronic information. The algorithms and displays presented herein are not inherently related to any particular computer or other apparatus. Various general-purpose systems may be used with programs and modules in accordance with the teachings herein, or it may prove convenient to construct a more specialized apparatus to perform desired method steps. The structure for a variety of these systems will appear from the description set forth below. In addition, the present invention is not described with reference to any particular programming language. It will be appreciated that a variety of programming languages may be used to implement the teachings of the invention as described herein. The instructions of the programming language(s) may be executed by one or more processing devices, e.g., central processing units (CPUs), processors, or controllers.

Exemplary embodiments, as will be described in greater detail below, provide systems, methods and computer programs for a storage system having a function to extract text from a file or object so as to offload the process of text extraction from index servers to the storage system and thereby reduce network traffic. The method for extracting the text depends on the type of original file which is to undergo the text extraction. Types of files can be distinguished in various manners, such as by identifying the extension of the file name or by referring to the MIME (Multi-purpose Internet Mail Extension) type. The storage system provides an interface to retrieve the extracted text from the storage system for delivery to index servers. The interface can be implemented by using a standard interface, such as NFS or XAM, or with a proprietary interface. The storage system may also include a management interface to record the time of text extraction and the manner in which the text is extracted text, and this information can be maintained in the storage system for future use. The management interface also may be applied to control how other storage functions are applied to the extracted text.

In a preferred embodiment, a network-attached storage system provides a text extraction function to an index server. The text extraction function is operative to extract text from files stored on the storage system when the index server requests a file on the storage system and is identified by the storage system as a requestor that should receive extracted text rather than the entire requested file. The index server communicates with the storage system by using the NFS protocol or other suitable communications protocols and methods. When the storage system completes the text extraction for the requested file, the storage system sends the extracted text to the requesting index server instead of the returning the entire requested file, thereby reducing bandwidth used and reducing the amount of processing required at the Index server.

Exemplary System and Logical Structure

FIG. 1 illustrates an overview of a computer information system consisting of a plurality of computers in communication with a storage system via a network, such as a LAN (local area network) 10002, WAN (wide area network) or other suitable communication media. In the illustrated embodiment, an application server computer 10000, an index server computer 10001, a management server computer 10100, and a storage system 10200 are operatively connected for communication with each other via LAN 10002. Application server 10000 may perform input/output (I/O) operations, such as reading or writing files to and from storage system 10200. Storage system 10200 stores files received in I/O operations from application server 10000, and extracts text from these files, as described further below. Index server 10001 is configured to receive the extracted text from storage system 102000 instead of receiving entire files containing additional data, such as images, videos, and the like.

Each of application server 10000, index server 10001 and management server 10100 may be a generic computer including a CPU 10102, a memory 10101, a user interface (I/F) 10103, and a network port, such as a LAN port 10104, as illustrated with respect to management server 10100. Further, management server 10100 includes a management program 10105 stored in memory 10101 of management server 10100, and executed by CPU 10102 of management server 10100 to enable a user to view and change the settings of the storage system 10200, such as via the user interface 10103.

Storage system 10200 has a network interface, such as LAN I/F 10202 to facilitate communication with the server computers via LAN 10002. Storage system 10200 also includes a storage area 10221 for storing data, such as files 10222, which includes at least one storage medium, such as one or more hard disk drives (HDDs), optical drives, solid state storages, or the like, controlled by a storage area controller 10220, which may be a disk controller, etc. Storage system 10200 includes a CPU 10201 which executes a storage system control program 10301 stored in a memory 10203 or other computer readable medium. Storage system control program 10301 not only processes I/O requests sent from applications on application server 10000 and/or index server 10001, but also carries out the function of extracting text from files when required. Storage system control program 10301 also communicates with management server 10100 and processes management requests for managing access to extracted text from the servers. Memory 10203 also can contain several data structures and management information tables, including a file type table 10302 and a text reader table 10303, as discussed further below.

FIG. 2 illustrates the structure of file type table 10302. File type table 10302 indicates a file type definition 20002 of a MIME type for each corresponding file name extension 20001. The storage system control program 10301 can identify the type of a particular file by referring to file type table 10302 and matching the extension of the particular file with file name extension name 20001 in file type table 10302. The storage system control program 10301 then is able to determine how to extract text from a particular file based on the determined file type. Any of various known methods may be used for carrying out the actual text extraction by storage system control program 10301. For example, US Pat. Appl. No. US2005/0278293 to Imaichi et al., incorporated by reference above, describes text extraction techniques. However, any other text extraction techniques known in the art, or that may become known in the art, can be used, and the invention is not limited to any particular text extraction technology.

FIG. 3 illustrates the structure of text reader table 10303. Text reader table 10303 defines entities (text readers) to which the extracted text is made available. In other words, a text reader is a registered extracted data receiver that can be identified by the storage system as an entity that should receive only extracted text, rather than an entire file. The entity can be identified as a text reader by an ID of Requestor 30301. For example, the ID may include the IP address of the index server and/or a user name of the indexing server application. For instance, in these embodiments, an example of a text reader is the index server 10001, although the invention is not limited to providing extracted text to index servers. Typically, if a server computer that is not listed in text reader table 10303 requests to read a file, the storage system 10200 returns the file without making any modifications to the file content. However, according to exemplary embodiments of the invention, when the storage system 10200 receives a request from a computer that is registered as a text reader in the text reader table 10303, the storage system 10200 extracts text from the specified file and returns the extracted text to the requesting computer instead of returning the entire file contents.

Process Flows

Figure 4:
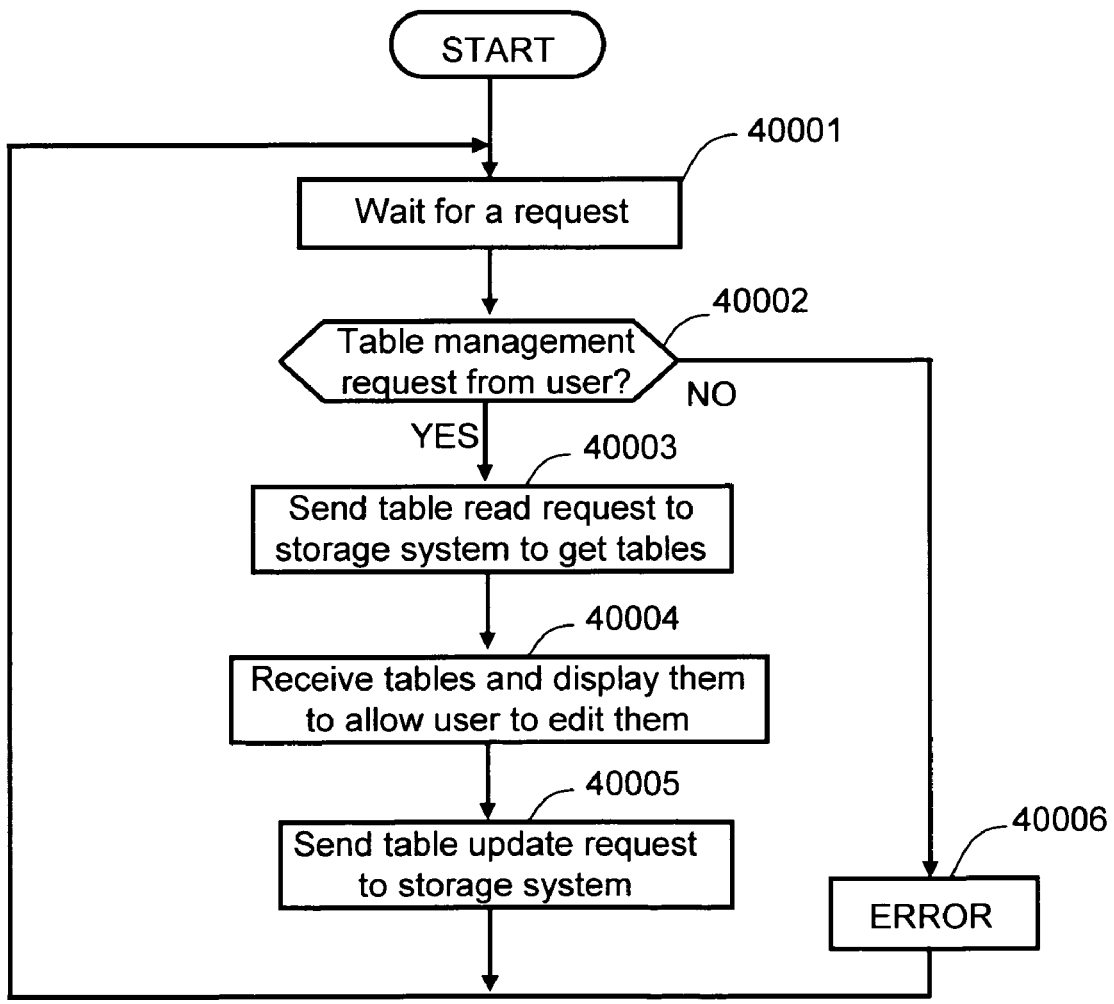
FIG. 4 illustrates an exemplary process flow of a management program for managing tables.

FIG. 4 illustrates an exemplary process flow of management program 10105 executed by management computer 10100, such as for editing and updating file type table 10302 or text reader table 10303.

At step 40001, management program 10105 receives a request from a user, such as a system administrator, via the user interface 10103, or the like.

At step 40002, management program 10105 determines whether the received request is a table management request.

At step 40003, when the received request is a table management request, management program 10105 sends a table read request to the storage system 10200, which requests that the storage system 10200 read the current file type table 10302 and/or text reader table 10303, and return the current information contained therein to management computer 10100.

At step 40004, management computer 10100 receives the requested tables and displays the information contained therein to the user that requested the information so that the user can edit the tables as desired.

At step 40005, After the user edits the information contained in tables 10302, 10303, management program 10105 sends the updated information to storage system 10200.

At step 40006, when the request received by management program 10105 is not directed to management of the file type table 10302 or text reader table 10303, then the request is erroneous for purposes of the present invention, and the request will not result in retrieval or display of the file type table 10302 or text reader table 10303 stored in memory 10203.

Figure 5:
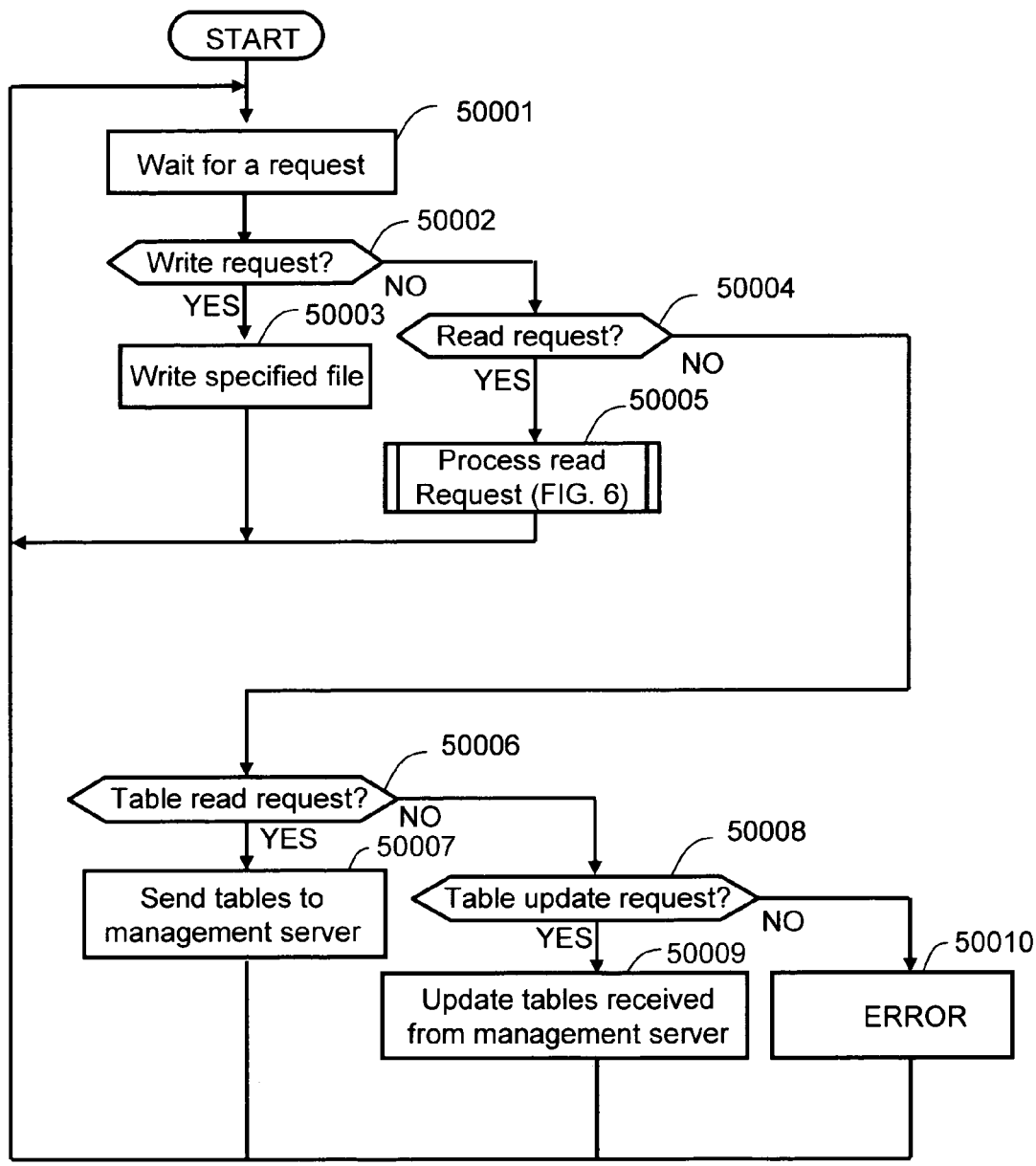
FIG. 5 illustrates an exemplary process flow of a storage system control program for handling read, write and update requests.

FIG. 5 illustrates an exemplary process flow of an overall process carried out by storage system control program 10301 in response to receiving a request from a computer via LAN 10002.

At step 50001, storage system control program receives a request from a computer, such as application server 10000, index server 10001, or management computer 10100. Generally, the request will be one of the following: a write request, which contains a name of a file to be stored and the content of the file to be stored; a read request, which contains a name of a file to be read; a table read request, which requests reading and return of the file type table 10302 and/or text reader table 10303; or a table update request, which provides new content for updating the file type table 10302 and/or text reader table 10303. Each such request also contains the ID of the requestor, and, for example, may be a standard read or write request, such as in accordance with NFS protocol.

At step 50002, storage system control program 10301 determines whether or not the received request is a write request, which contains a name (address) of a file to be stored and the contents (data) of the file to be stored. If the request is a write request, the process goes to step 50003; if not, the process goes to step 50004

At step 50003, when the request is a write request, the request is typically from a computer such as application server 10000 for updating application files contained in storage system 10200, or the like. Storage system control program 10301 stores the file data included with the write request in the storage area 10221.

At step 50004, when the request is determined to not be a write request, storage system control program 10301 next determines whether the request is a read request containing a name of a file to be read.

Figure 6:
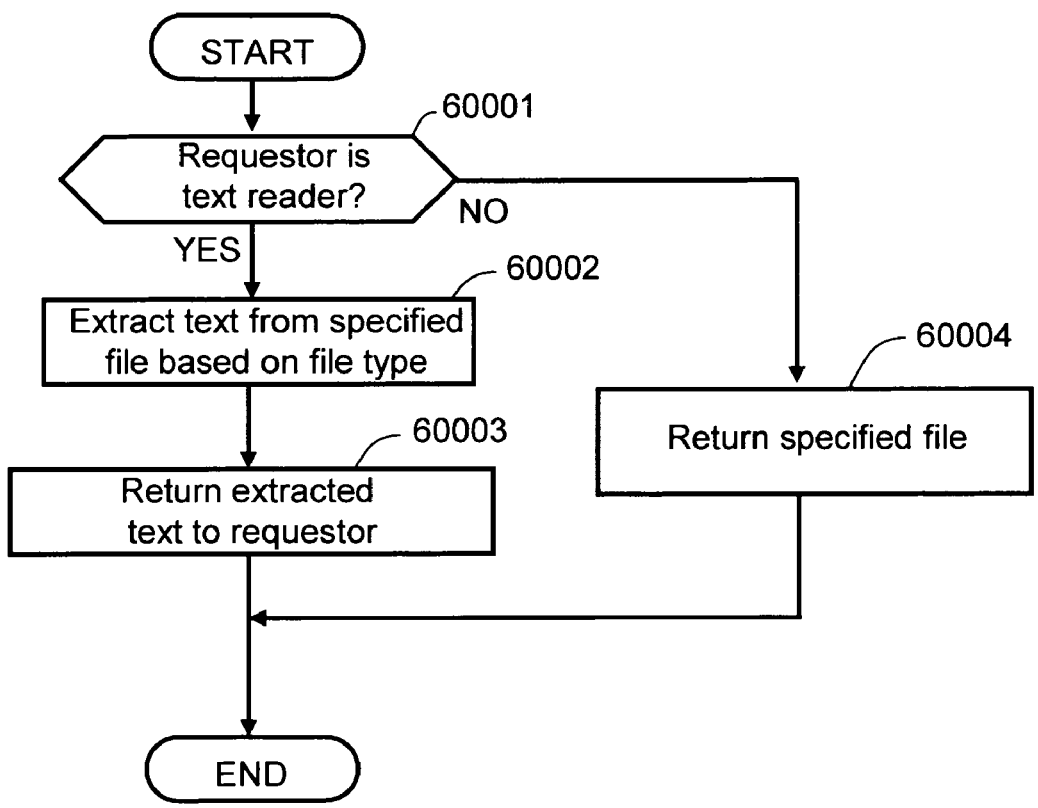
FIG. 6 illustrates an exemplary process flow of a read request.

At step 50005, the read request is processed in accordance with the exemplary process set forth in FIG. 6 for step 50005.

At step 50006, when the request is determined to not be a read request, storage system control program 10301 next determines whether the request is a table read request from the management computer 10100.

At step 50007, when the request is a table read request from the management computer 10100, then the storage system control program 10303 sends the requested file type table 10302 or text reader table 10303 to the management server 10100.

At step 50008, storage system control program 10301 determines whether the request is a table update request from management computer 10100.

At step 50009, when the request is a table update request, then the storage system control program 10301 updates the file type table 10302 and/or text reader table 10303 in accordance with the information received in the table write request.

At step 50010, when the request is not one of a write request, a read request, a table read request, or a table update request, the request is not a valid request according to the invention, and can be considered erroneous.

FIG. 6 illustrates an exemplary flowchart of a process for carrying out a read request according to step 50005 of FIG. 5.

At step 60001, storage system control program 10301 determines whether the sender of the read request is a registered text reader by referring to text reader table 10303 to determine whether the sender's ID is registered as a text reader requestor ID 30301 in the text reader table 10303.

At step 60002, when the sender of the read request has been determined to be a text reader, storage system control program 10301 retrieves the file specified in the read request and extracts the text from the specified file based upon file type. The type of the particular file is determined by referring to the file type table 10302 and matching the file name extension of the specified file with a type listed in the file type table 10302.

At step 60003, storage system control program 10301 returns the extracted text to the requestor instead of returning the entire file.

At step 60004, when storage system control program 10301 determines that the requestor of the read request is not a text reader, the specified file is sent to the requestor in a conventional manner.

Accordingly, from the foregoing, it may be seen that in the first embodiments, by offloading the process of text extraction from the index server to the storage system, the amount of network traffic may be reduced. An interface to access the text is provided without changing from standard NFS (Network File System) protocol. Further, because the text extraction takes place at the storage system rather than at the index server, the load on the index server is also reduced.

Second Embodiments

Figure 7:
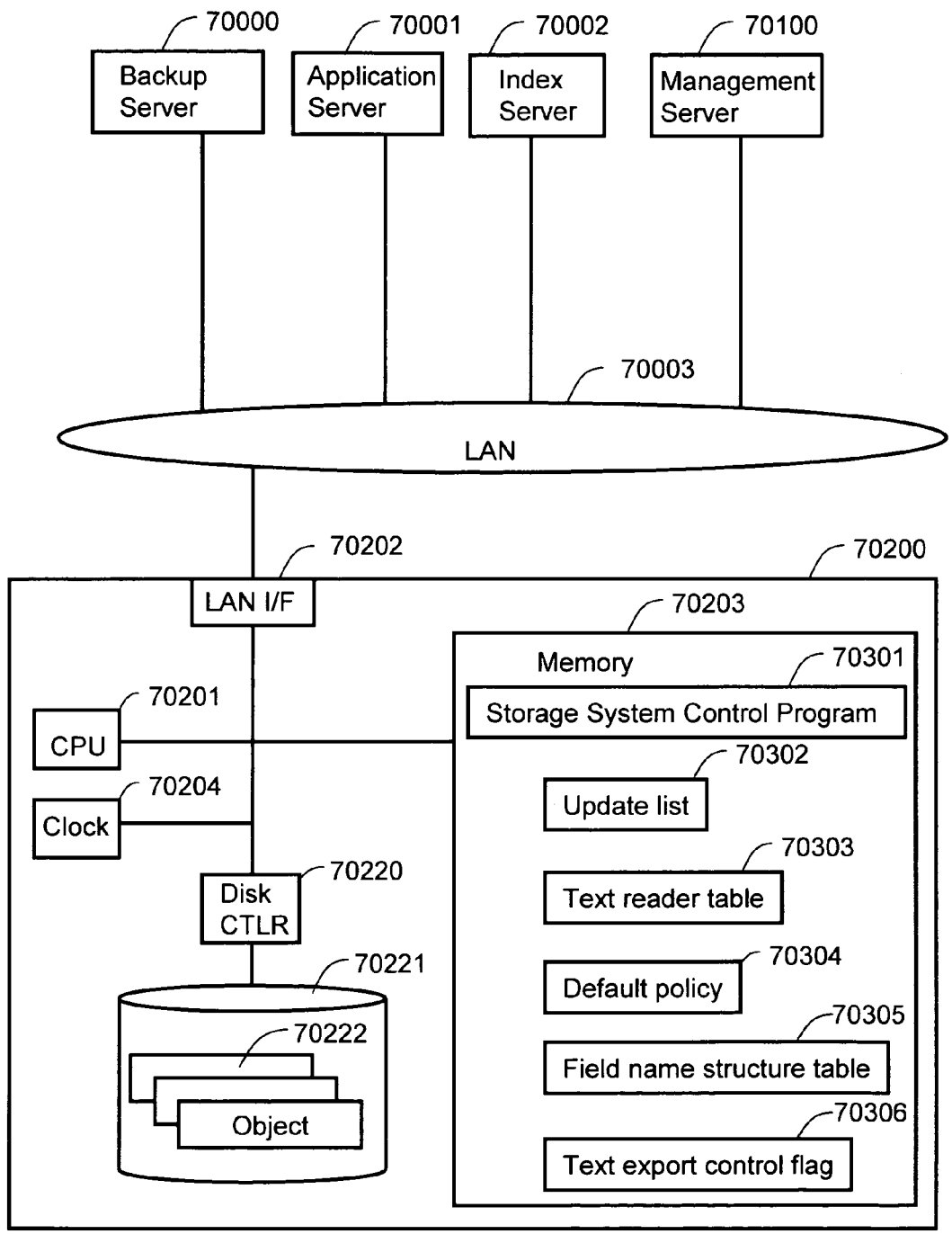
FIG. 7 illustrates an exemplary hardware and logical configuration in which second embodiments of the invention may be applied.
Figure 8:
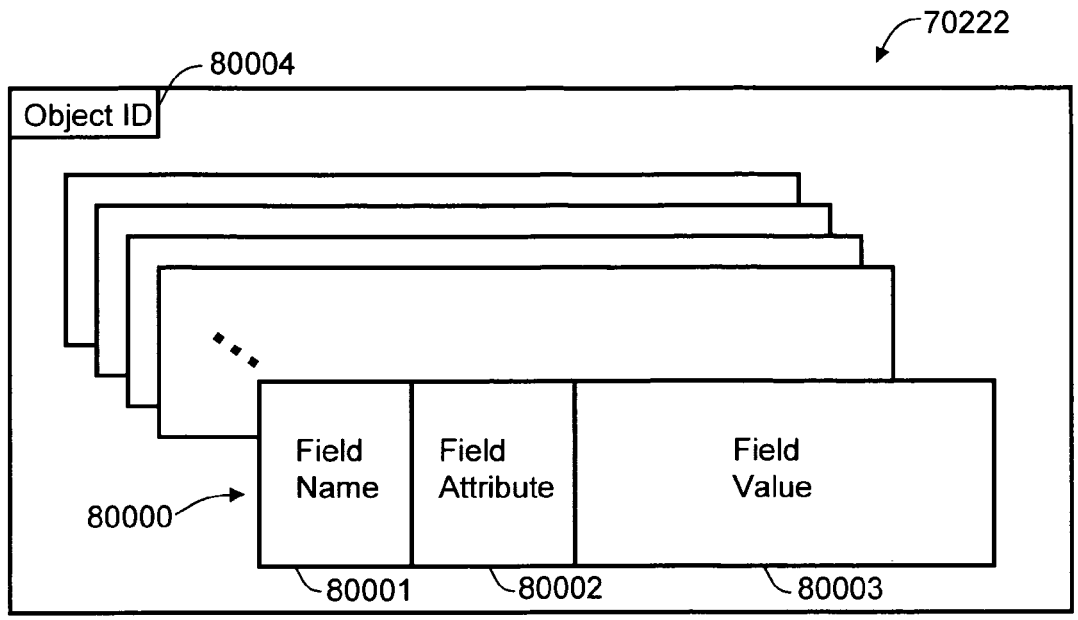
FIG. 8 illustrates an exemplary data structure of an object with data fields.

In second exemplary embodiments, as illustrated in FIG. 7, a storage system 70200 storing objects 70222 (i.e., in an object-based storage format) provides extracted text to an index server 70002 or other text reader. As illustrated in FIG. 8, an object 70222 is a collection of one or more fields 80000 that store information including data content and attributes and other data corresponding to the data content of the object. Each field 80000 includes a field name 80001, a field attribute 80002, for example, the MIME type of the field, and a field value 80003 which corresponds to the content data of the object. Each object is identified by an object ID 80004 which is generated by the storage system when an object is stored in the storage system. Typically, an application reads and writes to one or more particular fields 8000 in an object instead of to the whole object. Data written to the fields 8000 becomes persistent if the object is committed to the storage system. Details pertaining to creating and accessing objects are described in the XAM specification incorporated by reference above. In these embodiments, an object may contain one application field 80000, which contains data content to be indexed and may also contain multiple other fields 80000, which store management information. Further, while the XAM specification is used as an example in these embodiments, other object-based protocols and specification may be used in other embodiments of the invention.

According to exemplary embodiments, an administrator is able to specify when the text extraction function extracts text from objects and how the extracted text is maintained in the storage system or accessed by text readers. The storage system of these embodiments also provides a function to export an object to a backup server and a function to extract text from multiple objects specified by a text reader. The administrator also is able to specify whether or not the extracted text is included in an exported object. Computers may access objects and extracted text in the storage system by using an object-accessing interface such as XAM (Extensible Access Method) or other suitable interfaces and protocols.

FIG. 7 illustrates an example of a hardware and logical configuration in which the second embodiments of the invention may be applied. As illustrated in FIG. 7, storage system 70200 capable of storing data as objects is coupled to a number of computers over a network, such as a LAN 70003. The computers include a backup server 70000, an application server 70001, an index server 70002, and a management server 70100. The storage system 70200 includes a clock 70204 to provide the current time, a CPU 70201, a memory 70203 and a storage area controller 70220. Storage area 70221 may be one or more storage mediums, such as HDDs, solid state devices, or the like. A plurality of objects 70222 may be created and stored in storage area 70221. A storage system control program 70301 similar to that discussed in the first embodiments above is maintained in memory 70203 or other computer readable medium and executed by CPU 70201 for carrying out embodiments of the invention and other storage system functions. Also, a plurality of data structures are maintained in memory 70200 for storing management information, including an update list 70302, a text reader table 70303, a default policy 70304, a field name structure table 70305, and a text export control flag 70306.

Text reader table 70303 may have the same structure as text reader table 30301 illustrated in FIG. 3. However, in the second embodiments, the text readers (e.g., index server, etc.) are restricted to only accessing fields 80000 containing extracted text. The storage system control program 70301 prevents text readers from accessing the original data of an object 70222 or other parts of the object.

Text export control flag 70306 contains a value for providing an indication of TRUE or FALSE with respect to text exporting. In these embodiments, TRUE means that if an object is exported to the backup server, the extracted text of fields in the object is also exported. FALSE means that the extracted text is not exported. This control scheme can be applied to other functions which read or write the whole object. For example, similar flags can be used to specify whether or not the extracted text is included in an object if the object or text is replicated to a remote site.

Figure 9:
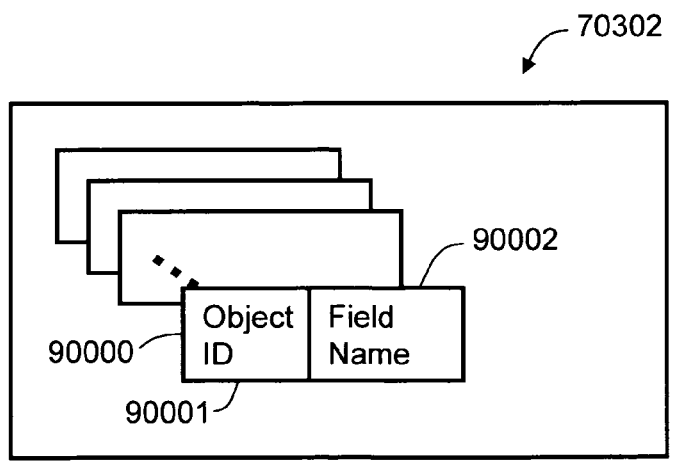
FIG. 9 illustrates an exemplary data structure of an update list having pointers to fields of objects.

FIG. 9 illustrates an exemplary data structure of update list 70302. Update list 70302 contains pointers 90000 to fields of an object. Each pointer 90000 consists of an object ID 90001 and a field name 90002. The pointers 90000 can be used to direct the storage system control program 70301 to extract text from the listed object field identified in the pointer 90000.

Figures 10, 11:
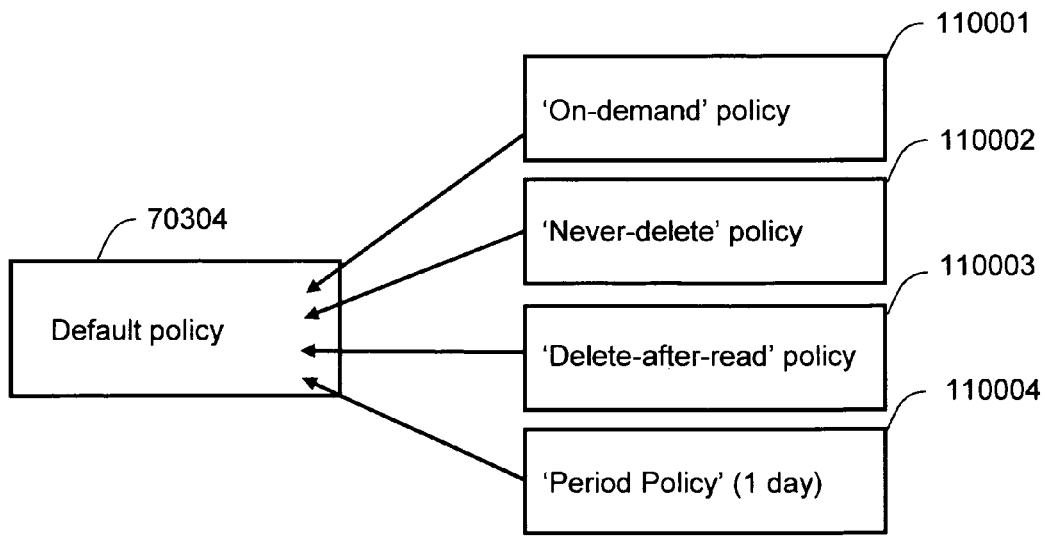
FIG. 10 illustrates an exemplary data structure of a table containing fields holding extracted text and management information.
FIG. 11 illustrates an exemplary conceptual diagram of available policies.

FIG. 10 illustrates an exemplary data structure of a field name structure table 70305 to be used for creating field names in an object for extracted text. Field name structure table 70305 defines the structure to be used for creating names of fields which contain extracted text and management information for an application field. Each column contains a prefix of a field name. The field name prefix of extracted text 100001 contains the field name prefix of extracted text. The field name prefix of extraction time 100002 contains the field of time the text is extracted. The field name prefix of extraction policy 100003 contains the field for a management policy for an application. For example, using the structures illustrated in FIG. 10, if an application has a field whose name is 'XXX' in an object, extracted text is stored in a field whose name is '.extracted.text.value.XXX', extraction time is stored in a field whose name is '.extracted.text.time.XXX', and the management policy is stored in a field whose name is '.extracted.text.policy.XXX' in the same object. The details of these policies are described later. In this embodiment, text extracted from a field is stored in one field for simplicity. However, if the results of extraction contain multiple parts, including segments of text or information other than text like layout of text in a document, they can be stored in multiple fields. For example, if text is extracted per page in a document, the text extracted from each page can be stored in an individual field.

FIG. 11 illustrates the default policy 70304 containing the default value of the management policy which specifies when the function extracts text from objects and how the text is maintained in the storage system. As illustrated in FIG. 11, examples of policies which may be set as the default policy 70304 are as follows: an 'on-demand' policy 110001, which means that text is extracted when a text reader requests the storage system to send the text; a 'never-delete' policy 110002, which means that text is extracted after an object is written and always held in the storage system with an indefinite retention period; a 'delete-after-read' policy 110003, which means text is extracted after an object is written, and the extracted text is held in the storage system until the extracted text is read by a text reader; and a 'period' policy 110004, which means text is extracted after an object is written and held in the storage system for the specified retention period following the text extraction. The period is specified as a part of the policy, as shown in 110004. These policies may be contained in an extraction policy field in an object.

Process Flows

Figure 12:
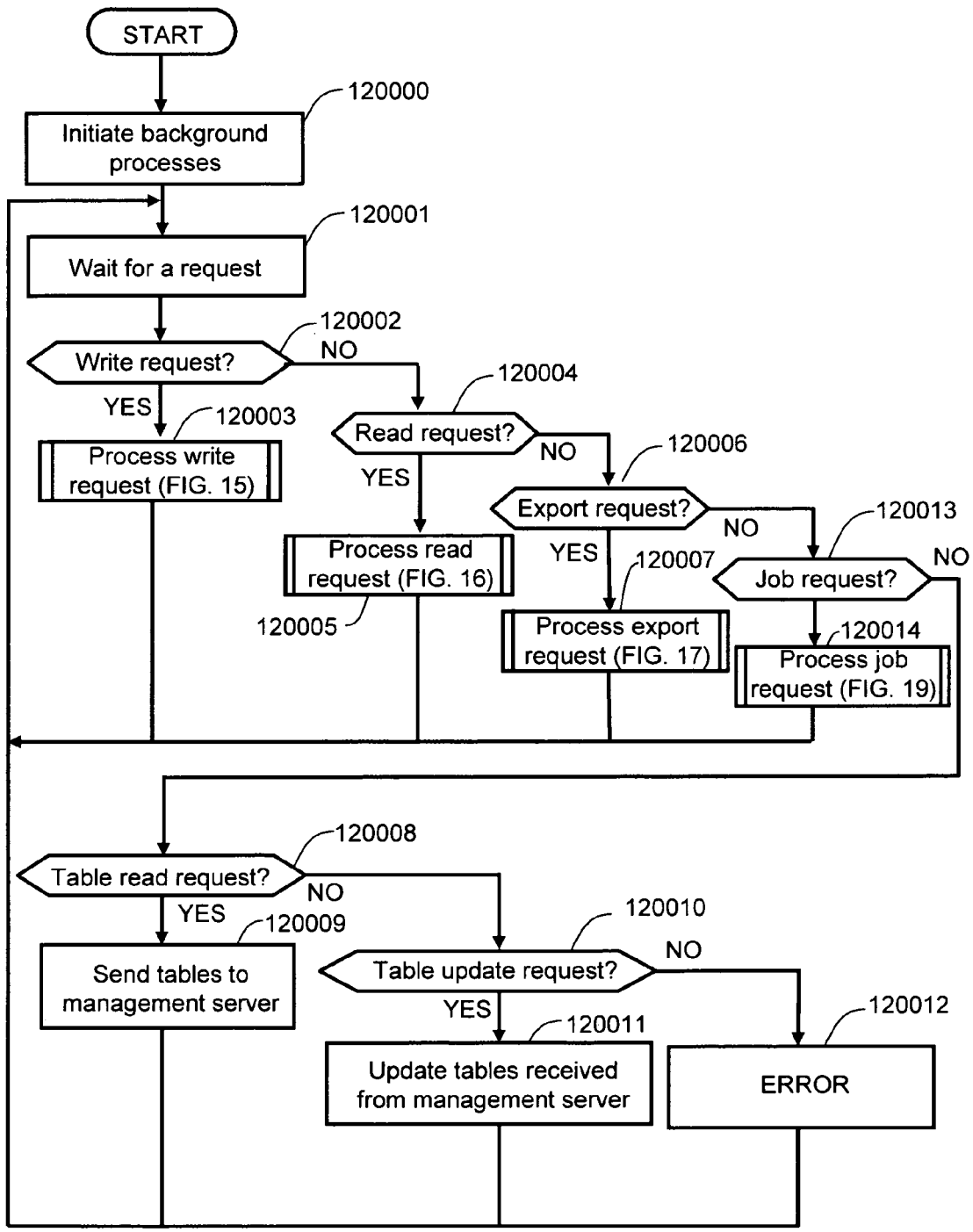
FIG. 12 illustrates an exemplary process flow of a storage system control program.

FIG. 12 illustrates an exemplary overall process flow of carried out by the storage system control program 70301 in these embodiments.

At step 120000, storage system control program 70301 initiates two background processes to maintain any extracted text that should be held in the storage system. These processes are a background text extraction process described further with reference to FIG. 13, and a background text deletion process described further below with reference to FIG. 14.

At step 120001, storage system control program 70301 receives a request from a computer, such as backup server 70000, application server 70001, index server 70002, or management computer 70100. These embodiments enable two additional requests not discussed above in the first embodiments, namely, an export request and a job request. Accordingly, the request will be one of the following: a write request, which contains an ID of an object, a name of a field to be stored or updated, and the content data to be stored; a read request, which contains an ID of an object and a name of a field to be read; a table read request, which requests reading and return of the management tables; a table update request, which provides new content for updating the management tables; an export request, which requests the export of an object by specifying the ID of the object; and a job request, which contains a job command, as discussed further below. When a request is received, the type of request is determined.

At step 120002, storage system control program 70301 determines whether or not the received request is a write request, which contains a name (address) of a file to be stored and the contents (data) of the file to be stored. If the request is a write request, the process goes to step 120003; if not, the process goes to step 120004

At step 120003, when the request is a write request, the request is typically from a computer such as application server 70001 for updating application files contained in storage system 70200, or the like. Storage system control program 70301 stores the file data included with the write request in the storage area 70221.

At step 120004, when the request is determined to not be a write request, storage system control program 70301 next determines whether the request is a read request containing a name of a file to be read.

Figure 16:
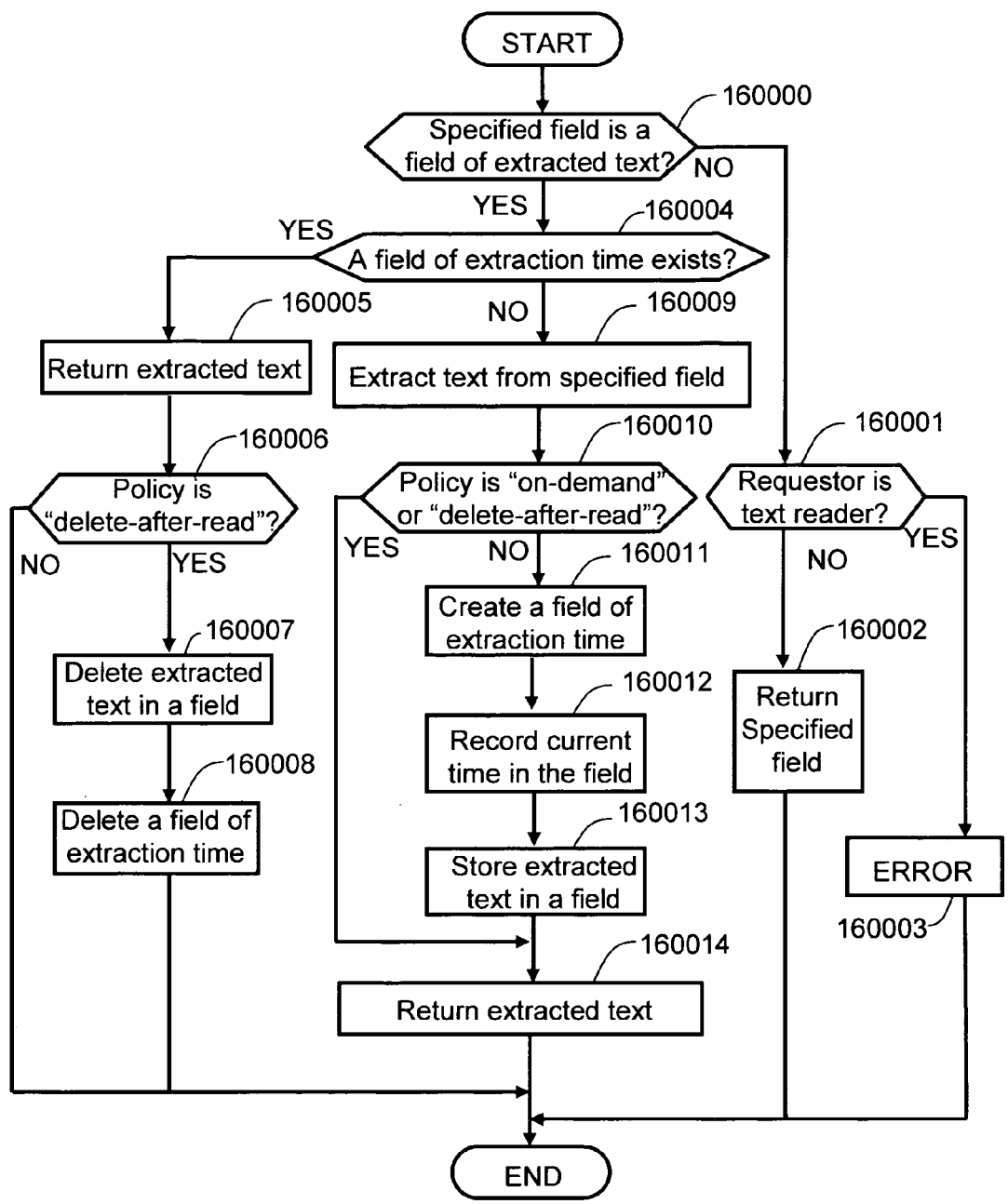
FIG. 16 illustrates an exemplary process flow of a read request.

At step 120005, the read request is processed in accordance with the exemplary process set forth in FIG. 16 for step 120005.

At step 120006, when the request is determined to not be a read request, storage system control program 70301 next determines whether the request is an export request.

Figure 17:
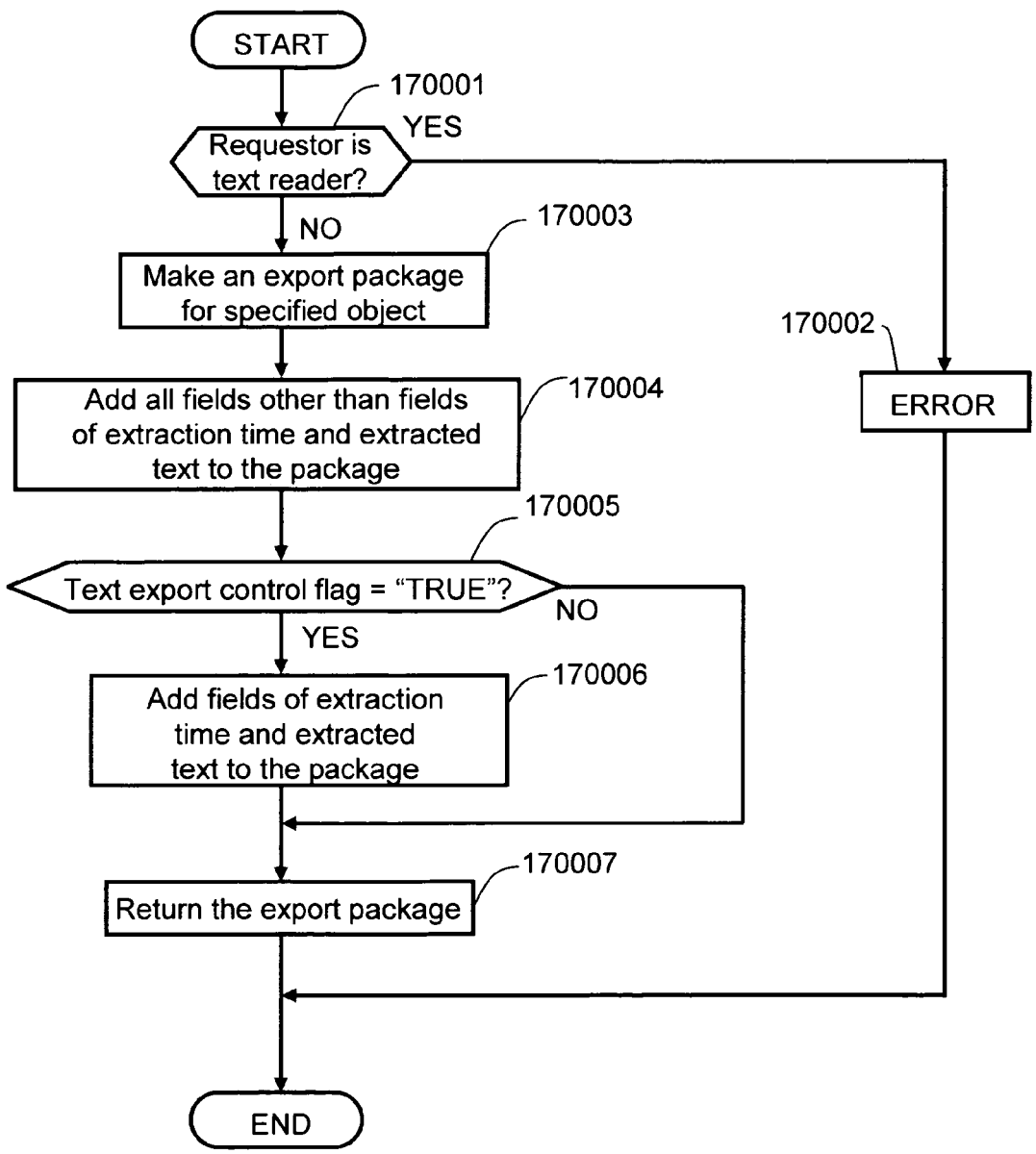
FIG. 17 illustrates an exemplary process flow of an export request.

At step 120007, when the request is an export request, then the request is processed in accordance with the exemplary process set forth in FIG. 17 for step 120007.

At step 120008, storage system control program 70301 determines whether the request is a job request.

Figure 19:
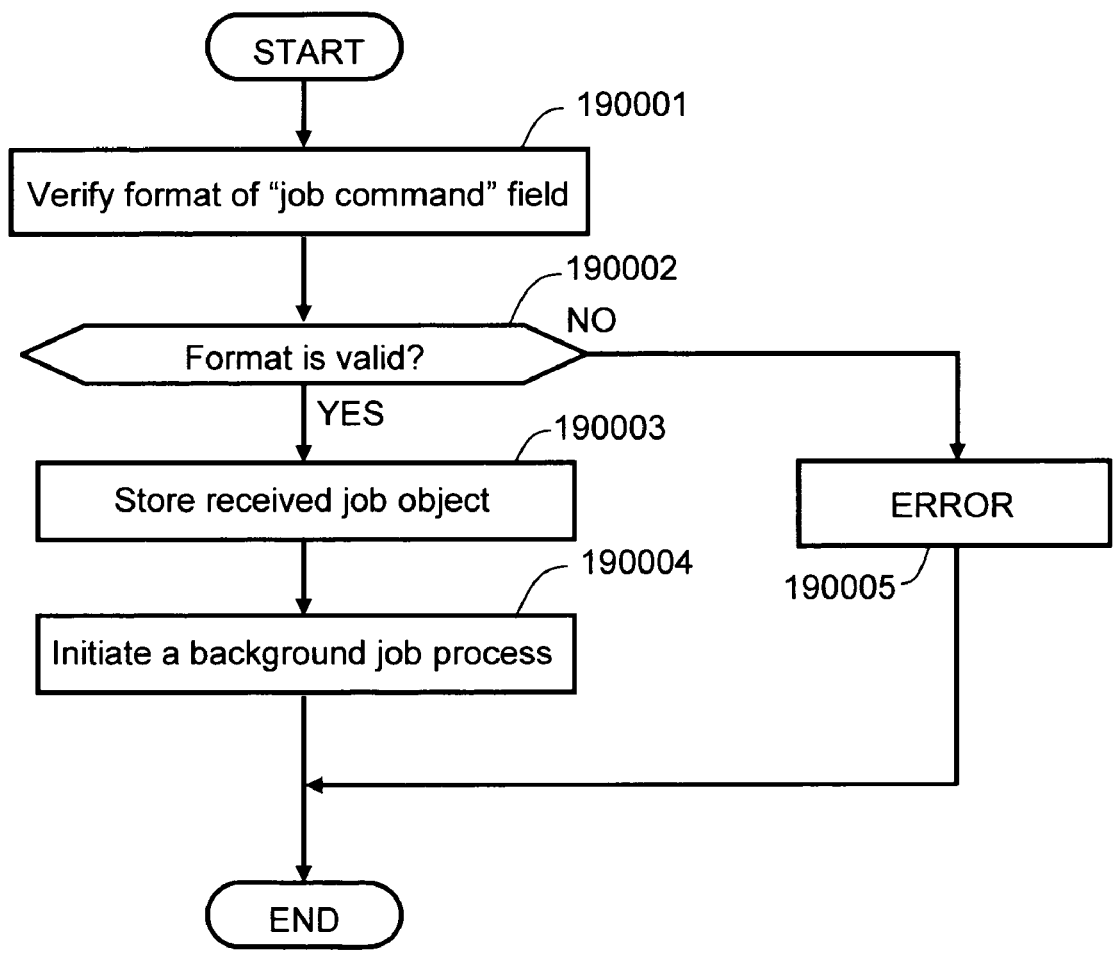
FIG. 19 illustrates an exemplary process flow of a job request.

At step 120009, when the request is a job request, then the request is processed in accordance with the exemplary process set forth in FIG. 19 for step 120009.

At step 120010, when the request is determined to not be a job request, storage system control program 70301 next determines whether the request is a table read request from the management computer 70100 for reading text reader table 70303 or other data structures 70304, 70305, or 70306.

At step 120011, when the request is a table read request from the management computer 70100, then the storage system control program 70303 sends the requested tables to the management server 70100.

At step 120012, storage system control program 70301 determines whether the request is a table update request from management computer 70100.

At step 120013, when the request is a table update request, then the storage system control program 70301 updates the specified tables, such as text reader table 70303 or other data structures 70304, 70305, or 70306 in accordance with the information received in the table write request.

At step 120014, when the request is not one of a write request, a read request, an export request, a job request, a table read request, or a table update request, the request is not a valid request according to the invention, and can be considered erroneous.

Figure 13:
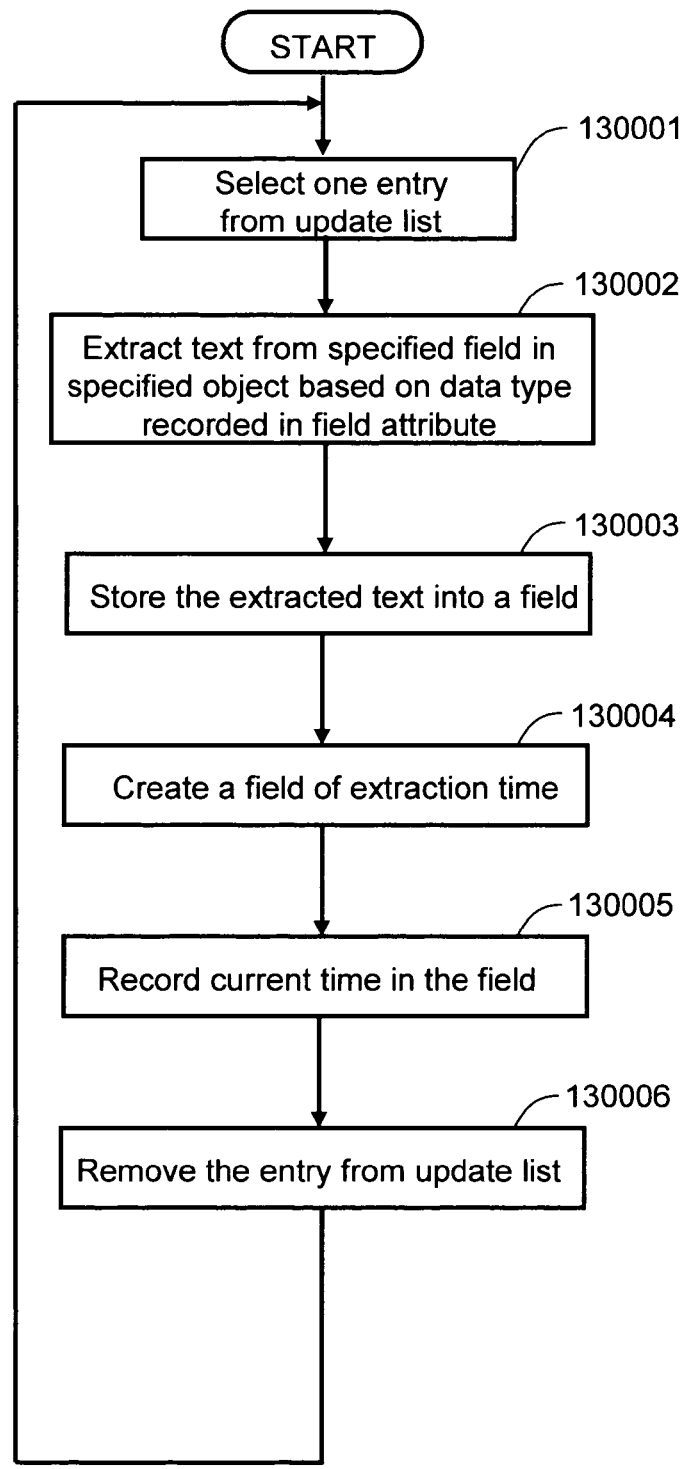
FIG. 13 illustrates an exemplary process flow of a background text extraction process.

FIG. 13 illustrates an exemplary process flow of the background text extraction process. The background text extraction process extracts text from fields 80000 in objects 70222 stored in storage system 70203 if a management policy specifies for the text to be extracted and held in the storage system.

One of policies 11001 through 11004 may be specified by a user, or if no policy is specified, then a default policy in effect for the storage system is applied.

At step 130001, storage system control program 70301 selects one entry from the update list 70302 for processing. Update list 70302 is a list of fields of objects stored in a storage system from which the text needs to be extracted. In other words, when storage system 70200 needs to extract text of a field that has not yet been extracted, a pointer to the field is added to update list 70302 so that the background text extraction process of FIG. 13 will subsequently extract the text from the field and store the extracted text in the storage system 70200.

At step 130002, storage system control program 70301 extracts text from the field specified in the update list 70302 based on the data type (e.g., MIME type) recorded in the field attribute 80002.

At step 130003, storage system control program 70301 stores the extracted text to a new field in the specified object. The name of the field is determined by the combination of the specified field name and the prefix 100001 as defined in field name structure table 70305.

At step 130004, storage system control program 70301 creates another field in the object to store the time at which the text was extracted and names the field in accordance with field name prefix of extraction time 100002 of field name structure table 70305.

At step 130005, storage system control program 70301 records the time at which the text was extracted in the field created in step 130004.

At step 130006, storage system control program 70301 removes the entry from the update list 70302 and returns to step 130001.

Figure 14:
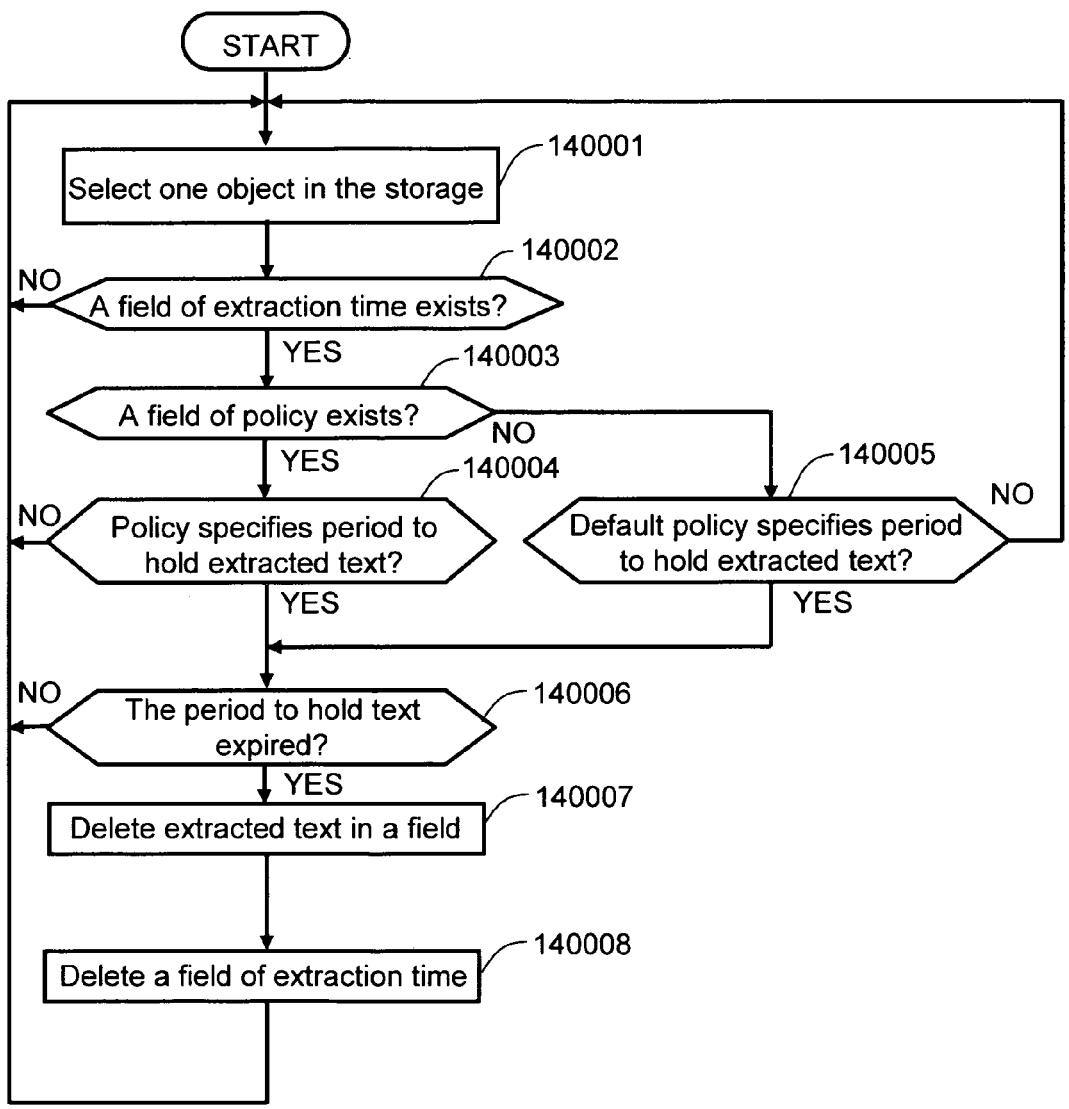
FIG. 14 illustrates an exemplary process flow of a background text deletion process.

FIG. 14 illustrates an exemplary process flow of the background text deletion process, which deletes extracted text when the specified period for which it was to be held has expired. Basically, the background text deletion process examines each object in the storage system, one-by-one, to determine whether the particular object has extracted text that is due to be deleted according to a corresponding policy.

At step 140001, storage system control program 70301 selects one object from storage area 70221 for processing.

At step 140002, storage system control program 70301 examines the selected object to determine whether an extraction time field exists in the object. When there is no extraction time field in the object, then there is no extracted text to be deleted in the object, and the process goes back to step 14001 to examine the next object.

At step 140003, when an extraction time field is located in the object, then storage system control program 70301 determines whether there is a management policy specified for the selected field. If there is a specified management policy for the selected field, the process goes to step 140004; if the field does not include a specified policy, the process goes step 140005 to check the default policy.

At step 140004, when a management policy is specified, storage system control program 70301 determines if the specified management policy specifies a time period to maintain the extracted text in the storage system. If the specified policy does not specify a time period to hold the text, the field does not have to be processed further and the process goes to step 140001 to process the next object.

At step 140005, storage system control program 70301 determines whether the default policy currently in effect in the storage system 70200 specifies a period to hold extracted text. If so, the process goes to step 140006; if not, the process goes to step 140001 to process the next object.

At step 140006, storage system control program 70301 determines whether the specified time period to hold the extracted text has expired. If so, the process goes to step 140007; if not, the process goes to step 140001 to process the next object.

At step 140007, storage system control program deletes the extracted text stored in the field to release storage area and increase usable capacity in the storage system 70200.

At step 140008, storage system control program 70301 deletes the field that stored the extraction time of the deleted text. These steps are repeated for all application fields in objects stored in the storage system 70200.

Figure 15:
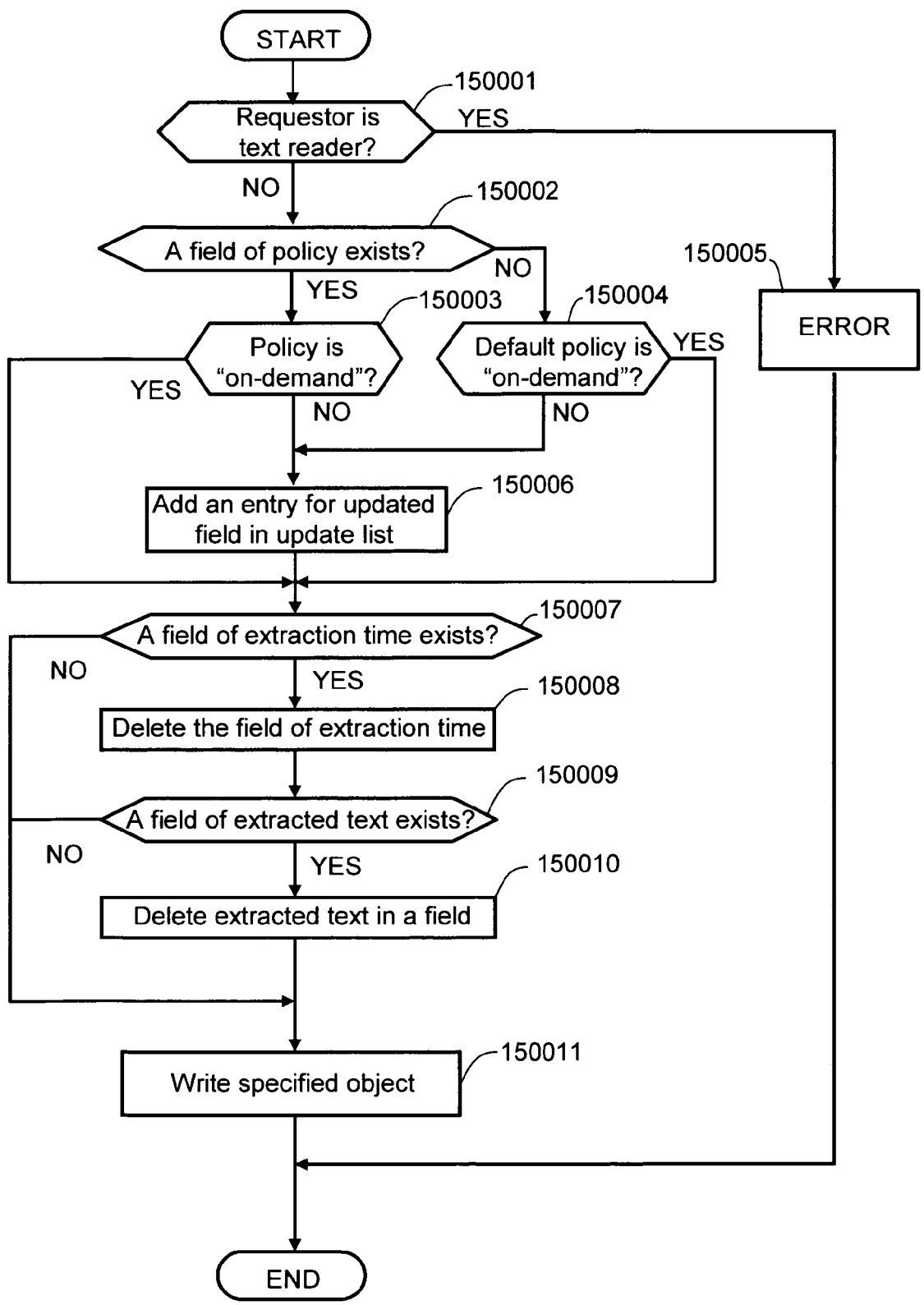
FIG. 15 illustrates an exemplary process flow of a write request.

FIG. 15 illustrates an exemplary process flow carried out when a write request is received at step 120003 of FIG. 12. This may occur, for example, when an application server writes updated data to one of the objects in the storage system. After an object is updated, any extracted text stored with the object is no longer valid, and needs to be deleted. Further if the policy for the object specifies that extracted text should be created and stored in the object, then a pointer to the object needs to be placed on the update list to have the text of the updated object extracted according to the policy.

At step 150001, storage system control program 70301 determines whether the sender of the write request is a registered text reader (i.e., a designated extracted data receiver) by referring to text reader table 70303 to determine whether the sender's ID is registered as a text reader requestor ID 30301 in the text reader table 70303. If so, the process goes to step 150005 to process as an error to prevent a text reader from writing an object; if not, the process goes to step 150002.

At step 150002, storage system control program 70301 determines whether a policy field exists for the object that is the target of the write request.

At step 150003, when a policy field exists for the object, storage system control program 70301 determines whether the policy is "on-demand". If so, an "on-demand" policy means that extracted text is not stored in the storage system for this object, but instead is only created when a text reader requests the extracted text.

At step 150004, when there is no policy field for the object, storage system control program 70301 determines whether the default policy is "on-demand".

At step 150005, storage system control program 70301 issues an error to prevent a text reader from writing to an object.

At step 150006, storage system control program 70301 adds a pointer to the update list 70302 to have the extracted text in the target object updated by the background text extraction process of storage system control program 70301.

At step 150007, storage system control program 70301 determines whether a field of extraction time exists in the target object.

At step 150008, storage system control program 70301 deletes the field that stored the extraction time.

At step 150009, storage system control program 70301 determines whether a field of old extracted text exists in the target object.

At step 150010, storage system control program 70301 deletes the field that stored the extracted text.

At step 150011, storage system control program 70301 writes the specified data to the target object in accordance with the write request. If the written object is a new object, a new object ID is assigned by the storage system control program and returned to the requestor.

FIG. 16 illustrates an exemplary process flow for carrying out a read request in step 120005 of FIG. 12. If the specified field to be read is not a field of extracted text, then the storage system control program checks whether or not the requestor is a text reader. If the requestor is a text reader, it cannot access any information other than extracted text.

At step 160000, storage system control program 70301 determines whether the specified field to be read from the target object is a field of extracted text.

At step 160001, when the specified field to be read from the target object is not a field of extracted text, storage system control program 70301 determines whether the sender of the read request is a registered text reader by referring to text reader table 70303 to determine whether the sender's ID is registered as a text reader requestor ID 30301 in the text reader table 70303. If so, the process goes to step 160003 to process as an error to prevent a text reader from reading text that is not extracted text; if not, the process goes to step 160002.

At step 160002, storage system control program 70301 returns the specified field to the requestor in response to the read request.

At step 160003, storage system control program 70301 issues an error to prevent a text reader from reading a field that is not extracted text.

At step 160004, when the specified field is a field of extracted text, storage system control program 70301 determines whether a field of extraction time exists in the object that is the target of the read request. If so, this indicates that extracted text is stored in the object.

At step 160005, when a field of extraction time exists in the object, then storage system control program 70301 returns to specify the extracted text field to the requester of the read request.

At step 160006, storage system control program 70301 determines whether the policy for the extracted text is "delete-after-read".

At step 160007, storage system control program 70301 deletes the field of the extracted text in the target object.

At step 160008, storage system control program 70301 deletes the field that stored the extraction time.

At step 160009, on the other hand, when a field of extraction time does not exists in step 160004, the object storage system control program 70301 extracts text from the specified field in the target object.

At step 160010, storage system control program 70301 determines whether the policy associated with the object is on-demand or delete-after-read. If so, the process gets to step 160014, and the text is sent to the requestor but not stored in the storage system. If not, then the extracted text will also be stored in the object.

At step 160011, storage system control program 70301 creates a field for storing the extraction time of the extracted text.

At step 160012, storage system control program 70301 records the time at which the text was extracted in to the field of the extraction time created in step 160011.

At step 160013, storage system control program 70301 creates a field for storing the extracted text, and stores the extracted text therein.

At step 160011, storage system control program 70301 returns the extracted text to the requester of the read request.

FIG. 17 illustrates an exemplary process flow for carrying out an export request at step 120007 of FIG. 12. In these embodiments, an export request can be sent from the backup server 70000 to obtain a package which contains information of the whole object instead of individual fields of the object.

At step 170001, storage system control program 70301 determines whether the sender of the export request is a registered text reader by referring to text reader table 70303 to determine whether the sender's ID is registered as a text reader requestor ID 30301 in the text reader table 70303 (i.e., a known extracted data receiver). If so, the process goes to step 170002 to process as an error to prevent a text reader from requesting export of an object; if not, the process goes to step 170003.

At step 170002, storage system control program 70301 issues an error to prevent a text reader from requesting export of an object.

At step 170003, when it has been determined that the requester is not a text reader, storage system control program 70301 creates an export package for the specified object.

At step 170004, during creation of the export package, storage system control program 70301 includes all fields contained in the object in the export package except for any field of extraction time or field of extracted text.

At step 170005, storage system control program 70301 determines whether the text export control flag is set to equal "TRUE".

At step 170006, when the text export control flag is set to equal 'TRUE' storage system control program 70301 also adds any fields of extraction time and extracted text to the export package. Otherwise, when the text export control flag is set to FALSE the extraction time and extracted text fields are withheld from being included in the export package.

At step 170007, storage system control program 70301 returns the export package to the requester of the export request.

Figure 18:
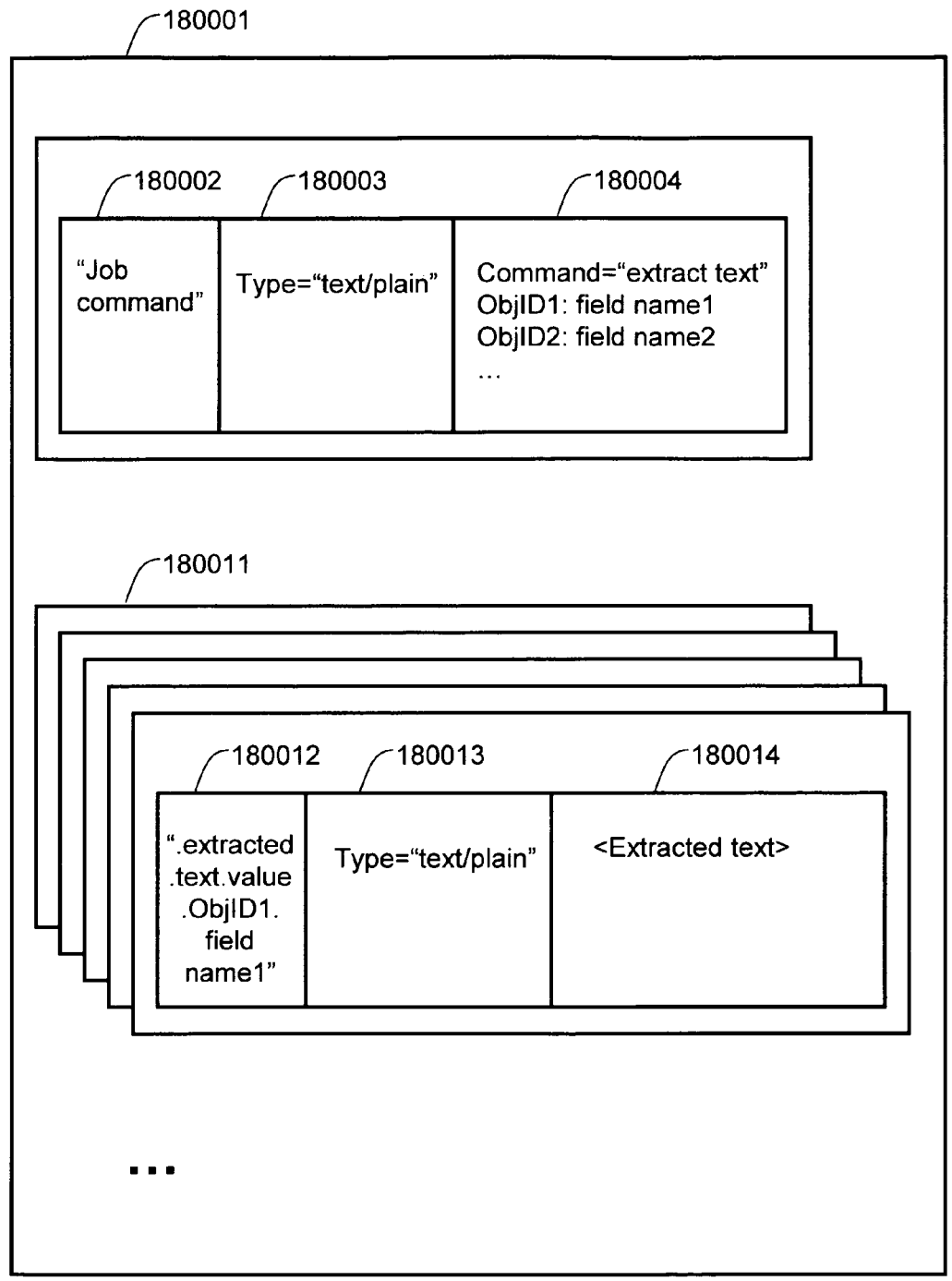
FIG. 18 illustrates an exemplary data structure of a job object in the storage system.

FIG. 18 illustrates an exemplary data structure of job objects in the storage system, which can be used for extracting text from a number of objects, instead of only one, via a single command. For example, by issuing a job request, a requestor can request all extracted text in the storage system using a single job request. In these embodiments, a job object 180001 contains a field specifying what processing actions should be taken by the storage system 70200. In an exemplary instance the job object is identified by its name 180002, such as "Job command"; type 180003 which specifies the type of extracted data, e.g., "text/plain"; and value 180004, which contains lines of text. The first line in the value field 180004 specifies the type of job. In the illustrated embodiment, the type of job is indicated by the text string of 'Command="extract text"'. Then, the lines that follow specify the fields where the storage system control program will extract text. Each line contains object IDs and field names from which text is to be extracted. Other fields 180011 in the job object are created by the storage system control program and contain the extracted text for the specified fields specify by the field 180001. Each field 180011 in the job object has a name comprising the combination of a prefix, object ID, and field name 180012 and the type of extracted text 180013. The extracted text is contained in a specified field 180014.

FIG. 19 illustrates an exemplary process flow for carrying out processing of a job request in step 120014 of FIG. 12.

At step 190001, storage system control program 70301 verifies the format of the "job command" field 180002 of a received job request 180001.

At step 190002, storage system control program 70301 determines whether the format of the "job command" field 180002 is a valid.

At step 190003, storage system control program 70301 stores the object in the storage area and returns a new ID to the requestor, if necessary.

Figure 20:
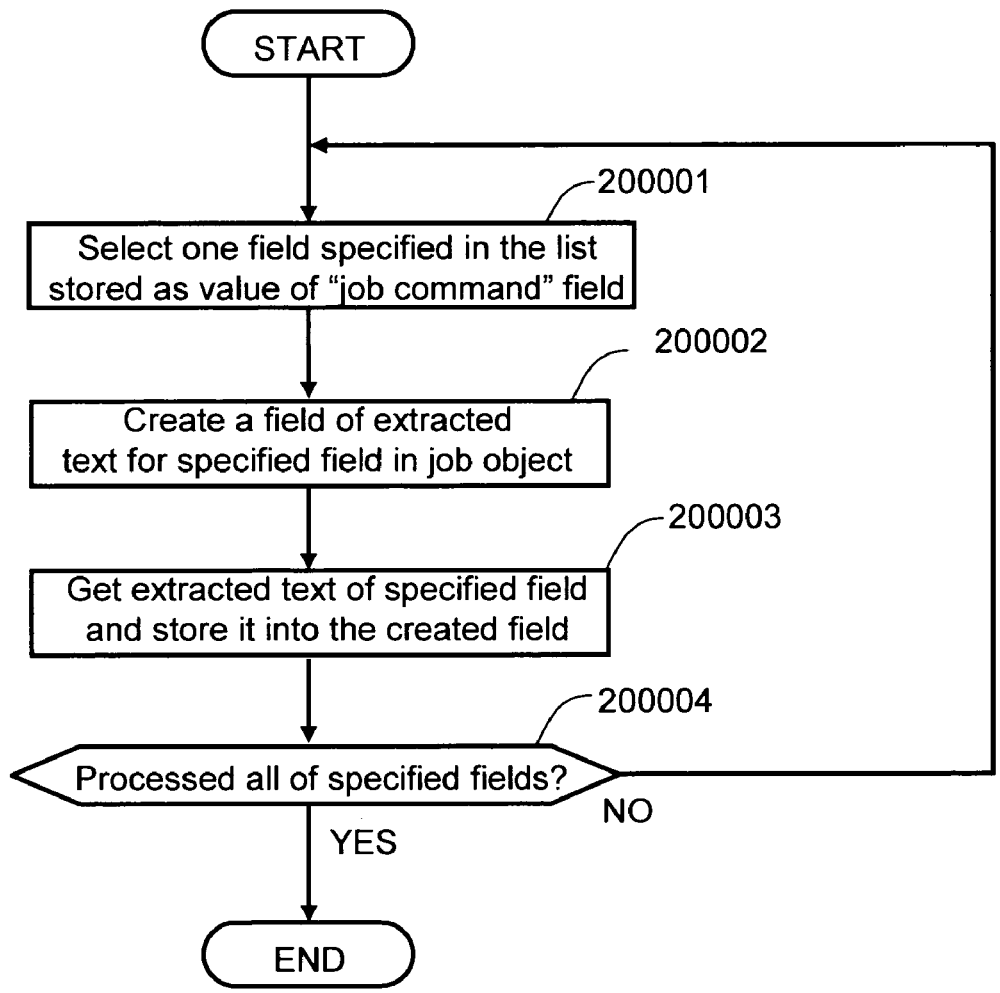
FIG. 20 illustrates an exemplary process flow of a background job.

At step 190004, storage system control program 70301 initiates a background job process, the details of which are set forth in FIG. 20.

At step 190005, if the format of the "job command" field 180002 is invalid, the job command is considered erroneous.

FIG. 20 illustrates an exemplary process flow of the background job process carried out in step 190004 of FIG. 19.

At step 200001, storage system control program 70301 selects one field specified in text area 180004 of the 'job command' field in the job object.

At step 200002, storage system control program 70301 creates a new field in the job object to store the text extracted from the selected field.

At step 200003, storage system control program 70301 obtains extracted text, as described, for example, in steps 160000-160014 of FIG. 16, and stores the extracted text into the new field created in step 200002.

At step 200004, storage system control program 70301 determines whether all fields in the job object have been processed. If not, steps 200001-200003 are repeated until all fields specified in the job object have been processed. The requester can obtain the extracted text by reading fields in the job object stored in the storage system.

In these embodiments, by specifying when the text extraction function extracts text from objects and by specifying how the extracted text is maintained in the storage system, an administrator is able to adjust the balance between the performance of a indexing process and the resource consumption of the storage system. In addition, the administrator is able to specify whether or not the extracted text is included in exported objects. Furthermore, according to exemplary embodiments, extracted text can be obtained from multiple fields of a number of different objects by sending a single job request, which reduces the number of communications between the index server and the storage system. Also, the requestor does not need to wait until the storage system finishes extracting text because the job request can be processed asynchronously by background processes within the storage system.

In addition, embodiments of the invention can also be easily applied to process data other than text. For example, the storage system control program 70301 can create a small thumbnail image from a larger image stored as a field in an object. In this case, instead of the function to extract text, the storage system control program has a function to convert a large image to a smaller fixed-size image, i.e., a thumbnail image. The process to create/store/access a thumbnail of an image file is executed by process flows similar to those illustrated in the embodiments for extracting text.

Accordingly, from the foregoing, it will be apparent that embodiments of the invention provide a storage system having a function to extract text or other data from a file or object in order to offload the process of extraction to the storage system and also to reduce network traffic. The method used for extraction depends on the original file type. Furthermore, the storage system may have a management interface that can be used for specifying when the text is extracted and how the text is maintained in the storage system. The storage system also may have a management interface to control how other storage functions are applied to the extracted text.

The method and system reduce network traffic and improve the performance and efficiency of the indexing process. The interface to retrieve extracted text can be implemented by using standard interfaces such as NFS or XAM. The management interface provides measures to adjust the balance between the indexing process performance and the storage system's consumption of resources.

Of course, the system configurations illustrated in FIGS. 1 and 7 are purely exemplary of information systems in which the present invention may be implemented, and the invention is not limited by these embodiments to a particular hardware or logical configuration. The computers and storage systems implementing the embodiments can also have known I/O devices (e.g., CD and DVD drives, floppy disk drives, hard drives, etc.) which can store and read the modules, programs and data structures used to implement the above-described invention. These modules, programs and data structures can be encoded on such computer-readable media. For example, the data structures of the various embodiments can be stored on computer-readable media independently of one or more computer-readable media on which the programs reside. The components of the system can be interconnected by any form or medium of digital data communication, e.g., a communication network. Examples of communication networks include local area networks, wide area networks, e.g., the Internet, wireless networks, storage area networks, and the like.

In the description, numerous details are set forth for purposes of explanation in order to provide a thorough understanding of the present invention. However, it will be apparent to one skilled in the art that not all of these specific details are required in order to practice the present invention. It is also noted that the invention may be described as a process, which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged.

As is known in the art, the operations described above can be performed by hardware, software, or some combination of software and hardware. Various aspects of embodiments of the invention may be implemented using circuits and logic devices (hardware), while other aspects may be implemented using instructions stored on a machine-readable medium (software), which if executed by a processor, would cause the processor to perform a method to carry out embodiments of the invention. Furthermore, some embodiments of the invention may be performed solely in hardware, whereas other embodiments may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

From the foregoing, it will be apparent that the invention provides methods, apparatuses, systems and programs stored on computer readable media for reducing network traffic and the workload of servers by offloading a portion of the information processing task from the servers to the storage system. Additionally, while specific embodiments have been illustrated and described in this specification, those of ordinary skill in the art appreciate that any arrangement that is calculated to achieve the same purpose may be substituted for the specific embodiments disclosed herein. This disclosure is intended to cover any and all adaptations or variations of the present invention, and it is to be understood that the terms used in the following claims should not be construed to limit the invention to the specific embodiments disclosed in the specification. Rather, the scope of the invention is to be determined entirely by the following claims, which are to be construed in accordance with the established doctrines of claim interpretation, along with the full range of equivalents to which such claims are entitled.

What is claimed is:

1. A method of operating a storage system, comprising:

providing a storage system including at least one storage medium configured to store files, said storage system being connected for communication with one or more computers via a network, said storage system including a text reader table storing a plurality of identifiers for text readers;

receiving, at the storage system, a plurality of read requests for a specified file;

determining whether a sender of the read request is a known extracted text receiver that should receive only extracted text in response to the read request, as identified by referring to said text reader table;

extracting text from contents of the specified file residing on the storage system when the sender of the read request is a known extracted text receiver and transmitting, from the storage system, the text extracted from the specified file to the sender; and sending the specified file when the sender of the read request is not a known extracted text receiver, wherein said text readers are identified by identifiers of computers sending said read requests.

2. The method according to claim 1, further comprising a step of providing an indexing computer as the sender of the read request, said indexing computer sending the read request for indexing contents of the files stored in said storage system;

wherein in said determining, said storage system checks if the text reader table stores the identifier for the sender of the read request, thereby identifying the sender as one of the plurality of text readers.

3. The method according to claim 1, further comprising a step of receiving at the storage system a write request from a management computer, said write request providing updated information for registering known extracted text receivers or for designated MIME (Multi-purpose Internet Mail Extension) types for use during text extraction; and updating information stored in the storage system for identifying known extracted text receivers or MIME type used during text extraction.

4. The method according to claim 1, further comprising a step of extracting the text by referring to MIME (Multi-purpose Internet Mail Extension) information stored in the storage system for identifying a file type of the specified file.

5. An information system, comprising:

a storage system including a processor, a memory, and a storage area configured to store a plurality of data objects, said data object including content data, said storage system including a text reader table storing a plurality of identifiers for text readers, said storage system being configured to extract data from the content data in response to a policy associated with each data object and store the extracted data on the storage area in association with the particular data object from which the extracted data was extracted, and wherein the storage system is configured to receive a plurality of read requests for a specified file of content data, determine whether a sender of the read request is a registered extracted data receiver as identified by referring to said text reader table, and send extracted data extracted from the content data of the specified file in response to the read request when the sender is a registered extracted data receiver, and to send the specified file when the sender of the read request is not a registered extracted data receiver, and wherein said text readers are identified by identifiers of computers sending said read requests.

6. The information system according to claim 5, wherein said storage system is further configured to determine a time at which each particular extracted data is extracted for each object, and wherein said storage system is configured to delete the particular extracted data from the storage system when the policy associated with the particular object indicates that a retention period for the extracted data has expired.

7. The information system according to claim 5, further comprising an indexing computer in communication with said storage system, said indexing computer being registered with said storage system as a registered extracted data receiver, wherein, when said storage system receives a read request from said indexing computer targeted to a data object stored in said storage system, said storage system returns the extracted data corresponding to said data object to said indexing computer.

8. The information system according to claim 5, wherein the extracted data is extracted text data extracted from corresponding content data of a corresponding data object, said content data including text and audio or video data.

9. The information system according to claim 5, wherein the extracted data includes a thumbnail image extracted from a larger image data or video data included in the corresponding content data of the corresponding data object.

* * * * *